US009356732B2

(12) United States Patent
Schubert et al.

(10) Patent No.: US 9,356,732 B2
(45) Date of Patent: May 31, 2016

(54) QUADRATURE ERROR DETECTION AND CORRECTION

(71) Applicant: ANALOG DEVICES, INC., Norwood, MA (US)

(72) Inventors: Richard P. Schubert, Medfield, MA (US); Mariko Medlock, East Boston, MA (US); Wei An, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 76 days.

(21) Appl. No.: 14/214,639

(22) Filed: Mar. 14, 2014

(65) Prior Publication Data

US 2014/0270001 A1     Sep. 18, 2014

Related U.S. Application Data

(60) Provisional application No. 61/786,393, filed on Mar. 15, 2013.

(51) Int. Cl.
| H04L 1/00 | (2006.01) |
| H04L 27/36 | (2006.01) |
| H04B 17/00 | (2015.01) |
| H04B 17/391 | (2015.01) |

(52) U.S. Cl.
CPC .......... H04L 1/0045 (2013.01); H04B 17/0085 (2013.01); H04L 27/364 (2013.01); H04B 17/3912 (2015.01)

(58) Field of Classification Search
CPC ...................... H04L 25/03019; H04L 27/2691; H04L 2025/0342; H04L 27/362; H04B 1/0014

USPC ................................... 375/346, 224, 260, 232
See application file for complete search history.

(56) References Cited

U.S. PATENT DOCUMENTS

| 5,705,949 A | 1/1998 | Alelyunas et al. |
| 6,748,029 B1 | 6/2004 | Lee |
| 7,894,555 B2 | 2/2011 | Lindoff et al. |
| 8,036,317 B2 | 10/2011 | D'Alessandro |
| 8,290,450 B2 | 10/2012 | Hammerschmidt et al. |

(Continued)

FOREIGN PATENT DOCUMENTS

| EP | 2367332 | 9/2011 |
| RU | 2011123470 | 1/2013 |
| WO | 2014/145350 | 9/2014 |

OTHER PUBLICATIONS

U.S. Appl. No. 14/214,660, filed Mar. 14, 2014.

(Continued)

*Primary Examiner* — Daniel Washburn
*Assistant Examiner* — Fitwi Hailegiorgis
(74) *Attorney, Agent, or Firm* — Patent Capital Group

(57) ABSTRACT

In an example, there is disclosed a system and method for detecting and correcting error in a quadrature receiver (QR). The QR may include a receiver channel operable to divide a received RF signal into I and Q channels. The receiver channel may include error sources, such as (in sequence) pre-demodulation (PD) error, LO mixer error, and baseband (BB) error. Test tones may be driven on the receiver channel at a plurality of test frequencies, and a quadrature error corrector may be provided to detect error from each source. Upon receiving an RF signal, the quadrature error corrector may apply correction coefficients to correct each source of error in reverse sequence (BB, LO, PD).

25 Claims, 7 Drawing Sheets

(56) References Cited

U.S. PATENT DOCUMENTS

| | | |
|---|---|---|
| 8,331,506 B2 | 12/2012 | Park et al. |
| 8,509,298 B2 | 8/2013 | Hormis |
| 2001/0022532 A1 | 9/2001 | Dolman |
| 2004/0063416 A1* | 4/2004 | Kuenen ............... H04L 27/3863 455/313 |
| 2005/0201487 A1 | 9/2005 | Gaschler |
| 2008/0219338 A1 | 9/2008 | Chrabieh |
| 2012/0087451 A1 | 4/2012 | Razzell |
| 2012/0263217 A1* | 10/2012 | Gossmann ............ H04L 27/366 275/224 |
| 2012/0314784 A1 | 12/2012 | Pratt et al. |
| 2014/0036983 A1* | 2/2014 | Ito ....................... H04L 25/0212 375/232 |
| 2014/0270002 A1 | 9/2014 | Schubert et al. |

OTHER PUBLICATIONS

International Search Report and Written Opinion in PCT Application Serial No. PCT/US2014/030091 mailed Jul. 10, 2014, 6 pages.
Non-Final Office Action issued in U.S. Appl. No. 14/214,660 mailed Sep. 9, 2015, 16 pages.
Chinese Patent Application Serial No. 201480014637.4 filed Sep. 14, 2015.
German Patent Application Serial No. 11-2014-001413.3 filed Sep. 15, 2015.

* cited by examiner

QUADRATURE ERROR DETECTION AND CORRECTION

CROSS-REFERENCE TO RELATED APPLICATIONS

This application claims priority to U.S. Provisional Applications 61/786,393, filed 15 Mar. 2013 and titled "Device for Countering IQ Imbalance in an RF Receiver", and U.S. Provisional Application 61/786,469, filed 15 Mar. 2013, titled "Method and Device for Identifying Receiver IQ Imbalance," both of which are incorporated herein by reference in their entirety.

FIELD OF THE DISCLOSURE

This application relates to the field of communications, and more particularly to a system and method for quadrature error detection and correction.

BACKGROUND

Quadrature amplitude modulation (QAM) is a modulation technique that may be used, for example, in quadrature receivers. A received signal may be divided into two carrier waves out of phase with each other by 90°, and are thus called quadrature carriers or quadrature components. Using QAM, arbitrarily high spectral efficiencies may be achieved with QAM by setting a suitable constellation size, limited only by the noise level and linearity of the communications channel.

In an ideal RF quadrature receiver, in-phase (I) and quadrature (Q) branches are perfectly orthogonal and have equal gain over frequency. Any imbalance from this ideal creates undesirable images since signals will be partially leaked to their frequency-negated counterparts. That is, a signal x Hz above a local oscillator (LO) will create an image perceived x Hz below LO, and simultaneously a signal x Hz below LO will create an image perceived x Hz above LO. This can have serious consequence in a wideband multi-carrier direct conversion receiver as these images fold directly into the baseband. Unless corrected, these images reduce signal-to-noise ratio (SNR), and consequently receiver sensitivity. The most serious consequences occur when magnitudes of received signals are highly dissimilar; loss of SNR is accentuated when a weak receive signal experiences interference from the image of a strong blocker.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
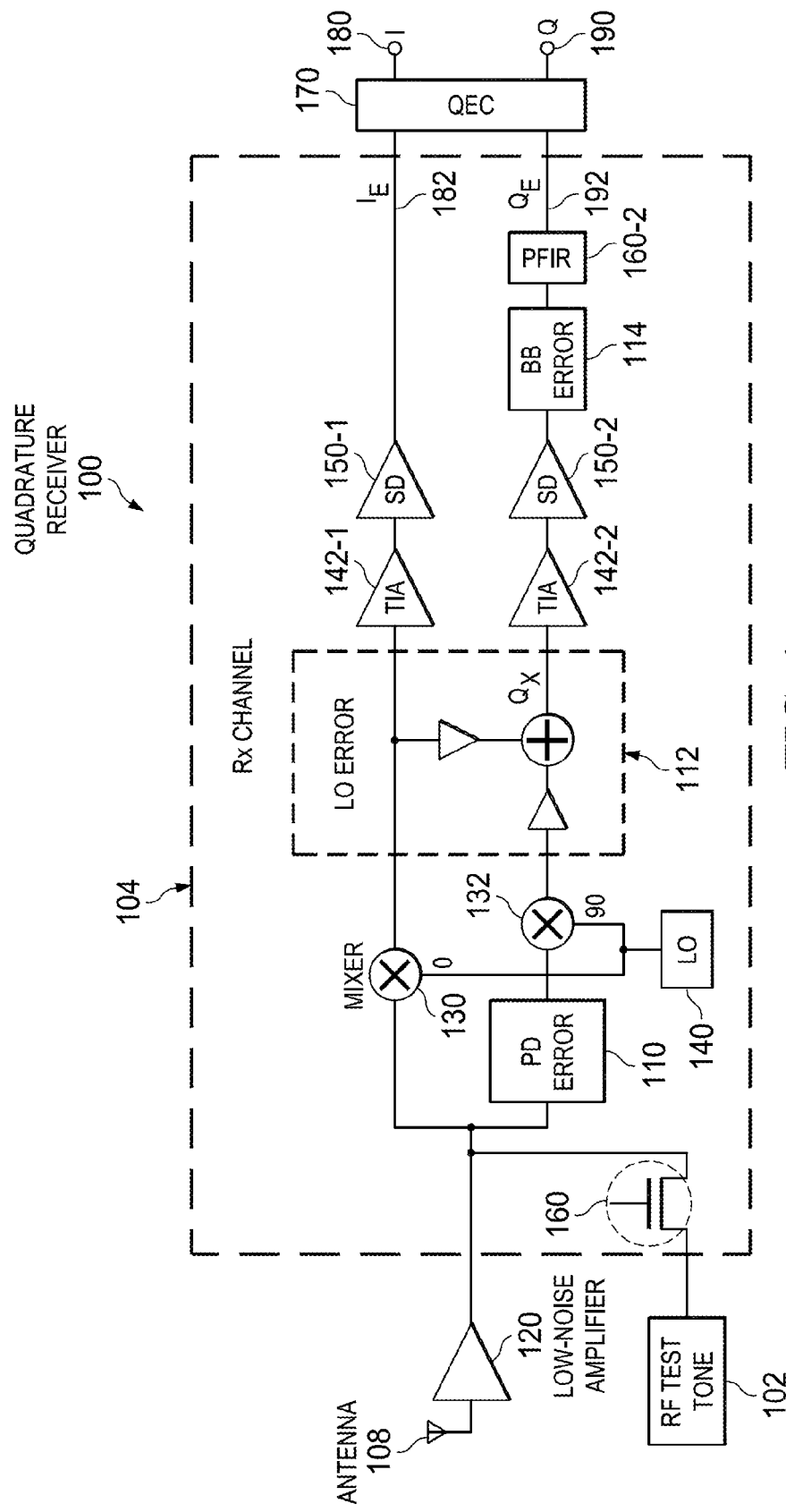
FIG. 1 is a block diagram of a quadrature receiver according to one or more examples of the present specification.

In an example, there is disclosed a system and method for detecting and correcting error in a quadrature receiver (QR). The QR may include a receiver channel operable to divide a received RF signal into I and Q channels. The receiver channel may include error sources, such as (in sequence) pre-demodulation (PD) error, LO mixer error, and baseband (BB) error. Test tones may be driven on the receiver channel at a plurality of test frequencies, and a quadrature error corrector may be provided to detect error from each source. Upon receiving an RF signal, the quadrature error corrector may apply correction coefficients to correct each source of error in reverse sequence (BB, LO, PD).

In one embodiment, there is disclosed an integrated circuit for correcting quadrature error in a received signal comprising circuitry and logic operable for receiving a separate error correction coefficient for each of a plurality of sequential error sources; and applying the error correction coefficients to the received signal in a reverse order of the sequence of the error sources.

In another embodiment, there is disclosed a quadrature receiver comprising a receiver channel operable for receiving a radio frequency (RF) signal; and a quadrature error corrector operable for receiving a separate error correction coefficient for each of a plurality of sequential error sources; and applying the error correction coefficients to the RF signal in a reverse order of the sequence of the error sources.

In another embodiment, there is disclosed a method of detecting quadrature error in a received signal comprising receiving a separate error correction coefficient for each of a plurality of sequential error sources; and applying the error correction coefficients to the RF signal in a reverse order of the sequence of the error sources.

In another embodiment, there is disclosed an integrated circuit for detecting quadrature error in a received signal comprising circuitry and logic operable for dividing the and received signal into I and Q channels, wherein the I channel and Q channel are separated by a nominal phase angle; processing the signal in a plurality of stages, wherein at least some of the stages comprise error sources characterized by lumped error models; and calculating an individual error value comprising a gain and a phase for each error source according to the lumped error model for that error source.

In another embodiment, there is disclosed a quadrature receiver comprising a quadrature receiver operable for receiving a radio frequency (RF) signal; and a quadrature error corrector operable for dividing the and received signal into I and Q channels, wherein the I channel and Q channel are separated by a nominal phase angle; processing the signal in a plurality of stages, wherein at least some of the stages comprise error sources characterized by lumped error models; and calculating an individual error value comprising a gain and a phase for each error source according to the lumped error model for that error source.

A method of detecting quadrature error in a received signal comprising dividing the and received signal into I and Q channels, wherein the I channel and Q channel are separated by a nominal phase angle; processing the signal in a plurality of stages, wherein at least some of the stages comprise error sources characterized by lumped error models; and calculating an individual error value comprising a gain and a phase for each error source according to the lumped error model for that error source.

Example Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In an example QE correction microarchitecture (QECM), two related but separate receiver (Rx) channel QE correction (QEC) algorithms may be implemented. The QECM may include a direct conversion receiver which offers up to 200 MHz of baseband bandwidth. An example digital algorithm determines analog sources of quadrature error (QE) in stages, by source, and then applies phase and gain correction digitally over frequency, again in stages by reverse order of the source. By countering QE in stages that are ordered opposite to error origination, correction is achieved effectively and accurately. Advantageously, because of the similarity of the calculations required, in on embodiment most of the QE observation hardware, and all of the QE correction hardware, can be shared between the two algorithms; only one QE observation algorithm needs to be active at a time. Both algorithms observe QE in the frequency domain, map it to a lumped analog source in order to identify appropriate compensation still in the frequency domain, and then apply correction to the IQ signal in the time domain.

The first algorithm uses an on-chip RF test tone generator to directly observe QE over frequency. This algorithm requires the receiver to be taken offline to prevent the receive signal from interfering with the RF test tone. The second algorithm requires the receiver to be online since it identifies IQ imbalance based on unexpected statistical correlation between positive and negative frequencies. An inherent limitation of this second algorithm is that QE observation can't begin for a particular frequency until after a receive signal happens to be provided at this frequency.

Together these two calibration algorithms partner to meet QR calibration requirements. They largely counter each other's weakness. RF tone based calibration is typically used at startup, but also supports tailored on demand re-calibration. It's also used to calibrate a loopback path that's critical to transmit channel calibration. Meanwhile, the statistical based algorithm excels at non-invasive calibration tracking. To speed convergence however, it benefits from notification of the initial calibration requirements for the full channel, which can be identified by an initial RF tone based calibration. Statistical based calibration may also be used stand alone in situations where taking the receiver offline cannot be tolerated. Reasons for this may be cost related since an external T/R switch is required to achieve adequate antenna isolation during RF tone based calibration. Reasons may also be system related since it may not be acceptable to occasionally take the receiver offline. Taking the receiver offline may be tolerable in a TDD setup, but could be problematic to a FDD setup.

In a system which contributes no meaningful observation error due to its analog or digital construction, error in IQ imbalance observation is dominated by:

a. Tone non-idealities—Tone frequency differs from intended, and has time varying phase and amplitude.

b. Channel contamination—Unwanted signal content, such as received RF signal, is present in addition to an applied test tone. Ideally, the test tone is the only signal source.

During IQ imbalance observation, received RF signal, and any other inputs to the receive path, should ideally be attenuated with respect to the applied test tone by deactivating a switch (internal or external to device), disabling the LNA, selecting a minimum input gain setting, or other option available.

RF test tones do not need to be pure sine waves with highly precise frequency and phase.

Purity of test tone improves rate of convergence possible, but moderate errors from intended frequency and phase may be countered without limiting the accuracy level of the observed IQ imbalance. Harmonics are also acceptable, and in fact offer an opportunity to calibrate multiple frequency regions simultaneously.

Frequency error and phase noise can be cancelled over time providing they are randomly distributed and have zero mean error as perceived by the disclosed observation methods of this Specification.

Completely eliminating short term tone frequency drifts and phase noise is difficult if frequency accuracy over time is achieved using a feedback loop. However, the use of a dithered feedback loop typically provided by a PLL does shape the error distribution favorably for cancellation by QEC 170.

Tone analysis, which is performed in the frequency domain, evaluates only the subband containing the calibration reference. This provides some immunity to consequence that might otherwise arise from interference. The fundamental of the calibration tone may be used as the calibration reference. Alternatively, a harmonic of the calibration tone may be used. Use of a harmonic rather than the fundamental is disadvantageous since the calibration reference will have less power, but use of a harmonic rather than a fundamental can ease the difficulty associated with generating a high frequency tone.

Multiple subbands may be tested in parallel if multiple tones are applied simultaneously. However, tones must not be placed in pairs of corresponding positive/negative subbands simultaneously (that is, pairs equally offset from LO, but oppositely signed). This would defeat the methods described in this Specification to isolate error source. Multiple harmonics of a tone generally can't be used since it is unlikely that more than one would be in band.

FIG. 1 is a block diagram of a quadrature receiver (QR) 100 according to one or more examples of the present specification. Throughout the remainder of this specification, a particular QR 100 characterized by the Analog Devices® AD9368 integrated circuit is used as an illustrative example. It should be noted, however that AD9368 is provided only as a single, non-limiting example, and many embodiments consistent with the appended Claims are possible.

In this example, an antenna 108 is configured to receive a radio frequency (RF) signal and provide the signal to a receiver (Rx) channel 104 via low-noise amplifier (LNA) 120. Rx channel 104 includes a plurality of stages, each of which may, in certain embodiments, comprise an error source. In certain configurations, each error source may be characterized by a lumped error model, wherein the lumped error model is concerned primarily with lumping error sources together that may be detected and corrected for jointly without reference to specifically which hardware provides the error.

In a pre-demodulation stage, the RF signal may receive a pre-demodulation (PD) error 110. Pre-demodulation error includes phase and gain error which originates, or has identical consequence, to error applied to the received RF signal prior to it being demodulated by the mixer to baseband. According to one or more embodiments of this Specification, actual source of an error is less important than the symmetry of the corrective action required at baseband to counter the error. In mixers 130 and 132, the RF signal is multiplied with a local oscillator (LO) frequency so that the RF signal can be stepped down to a baseband. In an example, mixer 130 provides an I channel, and mixer 132 provides a Q channel rotated for example by 90 degrees. The phase angle 90 degrees is disclosed herein, and is a common value used in many industry devices, but it should be understood that other phase angles are possible, and furthermore that 90 degrees is a nominal or ideal phase angle, and that any deviation from an ideal 90 degrees phase angle may form part of the QE described herein. Channels I and Q may be represented as complex vectors, each with a real magnitude and an imaginary components. Any error introduced in this stage may be represented as LO error 112.

Channel I may be provided to a transimpedance amplifier (TIA) 142-1 and then to a Sigma Delta ADC (analog to digital converter) SD 150-1.

Similarly, channel Q may be provided to a transimpedance amplifier (TIA) 142-2 and then to an SD 150-2. This stage may introduce a baseband error 114 between Q and I.

Figure 1A:
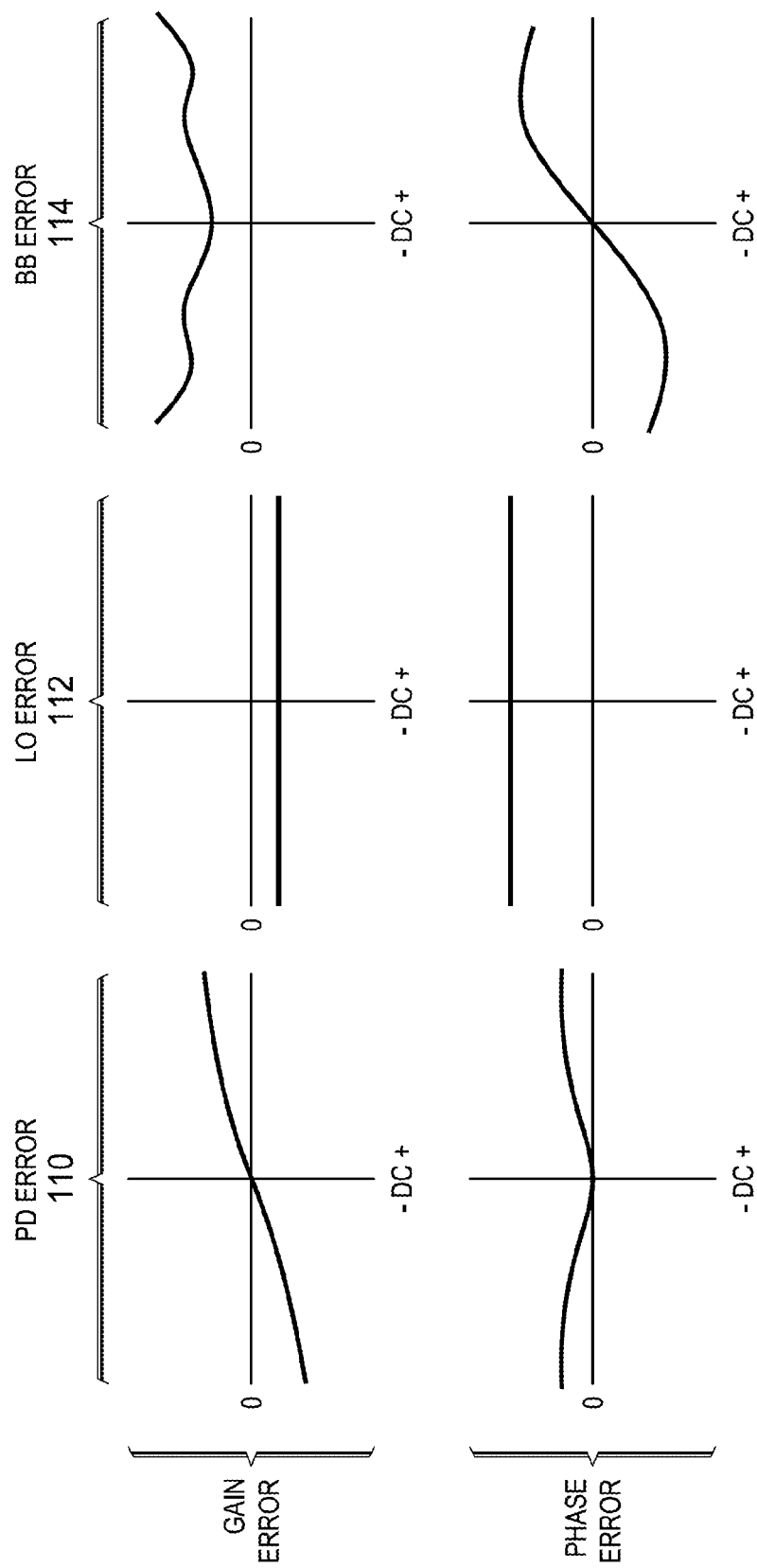
FIG. 1A is a series of error plots for error sources in a quadrature receiver according to one or more examples of the present specification.

FIG. 1A provides graphical examples of each of PD error 110, LO error 112, and BB error 114. Depending on where in the signal chain an error originates, it affect frequencies above and below LO with different symmetry. FIG. 1A graphically depicts the even and odd symmetries associated with gain error and phase error introduced at PD 110, LO 112, and BB 114 stages.

QE as described herein is not concerned with an absolute error compared to the original RF signal received on antenna 108, but rather with mismatch between I and Q channels from the relationship expected for an IQ receiver. Thus in one embodiment, an RF test tone 102 may be provided with a known magnitude and angle, and $I_E$ 182 and $Q_E$ 192 may be measured at QE corrector (QEC) 170 to determine a baseline or calibrated value for QE. A switch 160 is provided to control application of RF test tone 102 to Rx channel 104.

QEC 170 will be described with greater specificity hereafter, but in general terms, QEC 170 may be configured to detect QE by source using test tone 102, and to mathematically correct QE, for example by applying a correction in a reverse sequence of the error sources. For example, QEC 170 may separately detect and compute QE values for PD error 110, LO error 112, and BB error 114, and may provide a correction in the order BB error 114, LO error 112, and PD error 110. It should be noted that these stages are provided by way of non-limiting example only, and that certain embodiments may also detect and correct for other error sources, such as error in TIAs 142 or errors in SDs 150 by way of non-limiting example. Identifying error by lumped source, and correcting error in the opposite order it is generated, has significant advantage. As described with greater specificity hereafter, this enables error to be countered with to a high level of accuracy with low level of computational cost. Apparent complexity of correction required is significantly lessened if unrelated error sources, measured by their symmetries as depicted in FIG. 1A, are countered before they interact. Outputs of QEC 170 include corrected I and Q signals $I_C$ 180 and $Q_C$ 190.

As illustrated in FIG. 1, QE for quadrature receiver 100 may be lumped in one example into three sources: PD error 110 (mismatch in the pre-demodulation stage), LO error 112 (mixer LO-associated error), and BB error 114 (BB channel mismatch error). LO error 112 results when the phase angle applied between mixer 130 and mixer 132 is not precisely 90 degrees. BB error 114, in this lumped model, is comprised of all remaining Rx error after demodulation, plus all frequency independent magnitude mismatches before demodulation. In some examples, frequency-independent magnitude mismatch has an indistinguishable effect regardless of source, at least as related to correction, so that it is convenient to lump it with BB error 114. BB error 114 is dominated by phase and magnitude mismatch within TIA 142-2 and continuous-time sigma delta (-SD) 150-2, and by mismatched gain terms within mixers 130 and 132. The final lumped source, PD error 110, is the lesser of the three, and in some embodiments becomes significant only when bandwidth is high. It may, for example, be created by unbalanced application of LO 140 within mixers 130 and 132, such as unequal LO duty cycle. This tends to create asymmetrical magnitude mismatch linear with frequency from LO 140.

In the example QR 100, QE correction is focused solely on eliminating the difference between I and Q channel response. This allows I to be considered a reference, and all mismatches to be lumped onto Q. Correcting QE then involves identifying magnitude and phase mismatch of Q with respect to I across frequency, and modifying Q response to match that identified for I. Thus, in one or more embodiments, only one of either $I_E$ 182 or $Q_E$ 192 may be considered a meaningful "error" signal requiring correction. In the particular embodiment disclosed herein, only $Q_E$ 192 is a meaningful error signal.

Magnitude errors such as LO error 112 and BB error 114 affect positive and negative frequency counterparts identically if originated after demodulation. Therefore, magnitude error may be corrected by simply gaining the magnitude of Q to match that of I in a frequency-dependent manner without considering whether the frequency affected is actually positive or negative. Here, an RF frequency is considered negative if it is less than the LO frequency, and it is considered positive if it is greater than the LO frequency. Frequency-independent magnitude error before demodulation may also be solved this way since, by definition, it affects positive and negative frequencies identically. However, frequency-dependent magnitude error before demodulation also requires special attention as discussed below.

Unlike magnitude errors, phase errors may need to be closely attributed to their sources in order to appropriately compensate for them. This is because phase errors in BB error 114 shift positive and negative frequency counterparts in an identical direction; whereas phase errors introduced by LO error 112 shift positive and negative counterparts in an opposite direction. Correcting LO error 112 and BB errors 114 simultaneously across the full bandwidth is achieved in QR 100 by employing two different corrective countermeasures. PD error 110 again requires special attention as discussed below.

Figure 2:
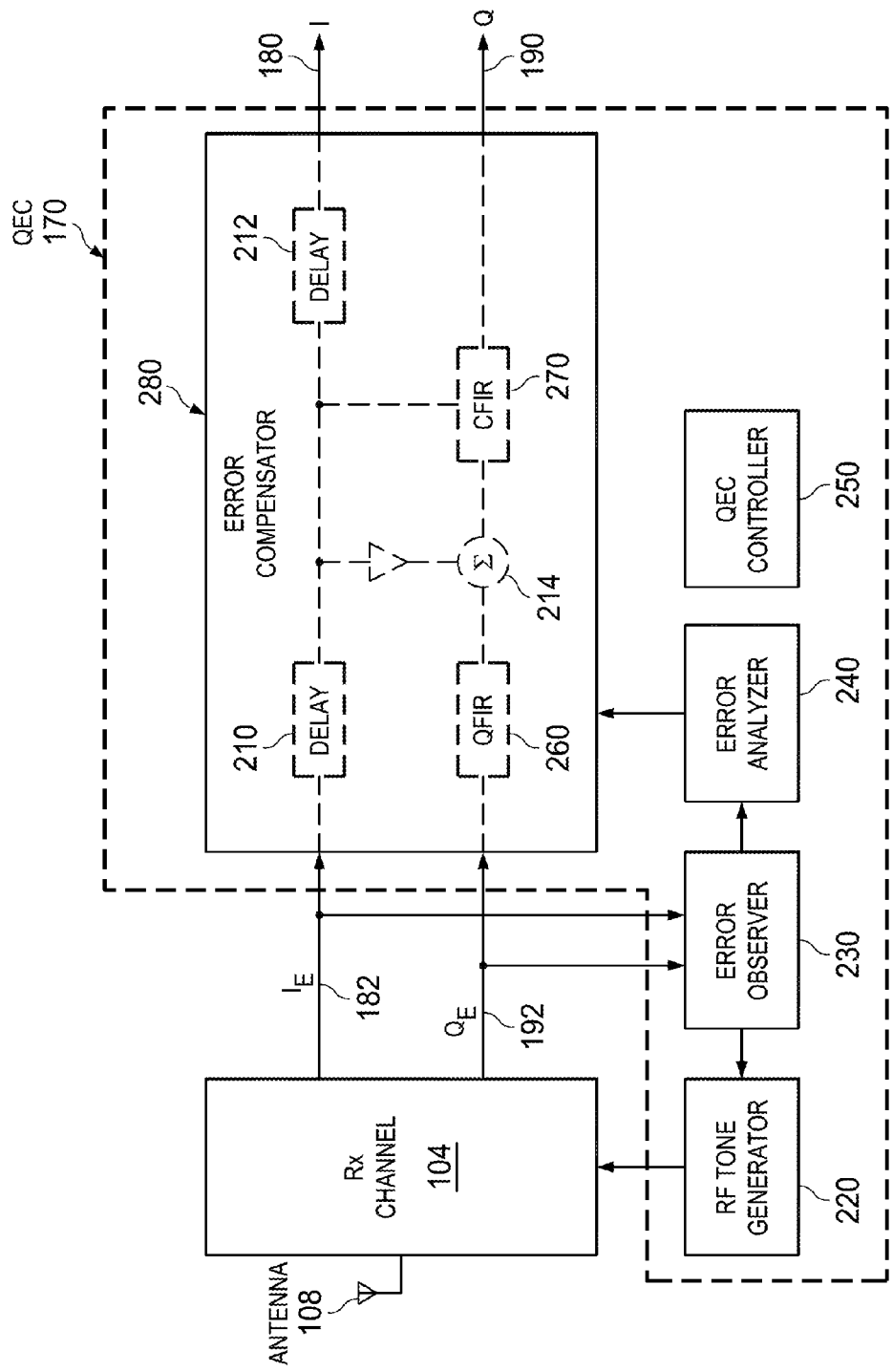
FIG. 2 is a block diagram of a quadrature error corrector according to one or more examples of the present specification.

An effective method for correcting LO error 112 is to add (or subtract) a scalar amount of I to Q. Taking advantage of the phase relationship between I and Q, this inexpensively counters LO phase error 112 by shifting all frequencies by an equal amount of phase, but as required in a direction dependent on the sign of the frequency. An effective method for correcting BB error 114 is to implement a correction on just the Q channel in QEC 170. Unlike adding I to Q, QEC 170 may shift the phase of positive and negative frequency counterparts in the same direction, and by an amount determined by the QEC 170's frequency response (the actual sign of an original frequency is irrelevant since this information is lost when Q is evaluated or processed independent of I). QEC 170 may also be used to correct BB error 114 magnitude, and may incorporate a scalar term to correct for Q magnitude attenuation resulting from LO error 112. In addition to causing Q to be sampled at the wrong phase, LO error 112 may also cause Q to be sampled off its peak. In an example, these two corrective measures (adding a signed amount of I to Q and applying QFIR 260 of FIG. 2), are applied in the opposite order that the errors they counter were introduced. Until BB error 114 is corrected by QFIR 160-2, the relationship between I and Q will not be equalized to what it was when LO error 112 introduced its artifacts on Q so correction will not yet be as trivial as adding I to Q. Therefore, in an example QFIR 260 of FIG. 2 is applied before the scalar addition of I to Q.

Once LO error 112 and BB error 114 have been corrected, PD error 110 compensation is more easily achieved. For the same reason it was beneficial to correct BB error 114 before LO error 112, it is also beneficial to correct both BB error 114 and LO error 112 before correcting PD error 110. In an embodiment, PD error 110 has been observed to have a relaxed transfer function. Compensation can therefore be achieved by a relatively simple complex filter on the Q channel, enabling positive and negative frequencies to receive the slight independent adjustment they require.

In an example system, QR 100 may be part of a transceiver system, and test tone 102 may be driven on QR 100 whenever the system is in transmit mode. Thus, QE in QR 100 may be continuously updated whenever QR 100 is not actively receiving an RF signal. In other embodiments, additional arrangements are possible. For example, in another example, QR 100 is part of a dual-band dedicated receiver with no transmitter functionality. In that case, one of the two receiver bands may occasionally be switched inactive to drive test tone 102 and measure QE. In another example, test tone 102 may be superimposed on a received RF signal. In yet another example, the received RF signal itself may be used as a test tone, and QE may be continuously updated. In an embodiment, test tone 102 may comprise a series of corresponding frequency pairs f, wherein each f comprises +f and −f.

In an example, a lumped error model for LO(f), wherein evaluation at frequency f comprises combining observations at frequencies +f and −f, is of the form $$LO_{PHA}(f) = \frac{(PHA(+f) + PHA(-f))}{2}$$

and $$LO_{MAG}(f) = \cos(LO_{PHA}(f)).$$

In an example, a lumped error model for BB(f), wherein evaluation at frequency f comprises combining observations at frequencies +f and −f, is of the form $$BB_{PHA}(f) = \left(\frac{PHA(+f) + PHA(-f)}{2}\right)$$

and $$BB_{MAG}(f) = \sqrt{MAG(+f) \times MAG(-f)}.$$

In an example, a lumped error model for PD(f), wherein evaluation at frequency f comprises combining observations at frequencies +f and −f, is of the form $$PD_{PHA}(f) = PHA(f) - \frac{PHA(+f) + PHA(-f)}{2} - LO_{PHA}$$

and $$PD_{MAG}(f) = \frac{MAG(f)}{BB_{MAG}(f)}.$$

Where:

$LO_{PHA}$ is identified by fitting $LO_{PHA}(f)$ to a polynomial of order n, and using the value returned when f is set to zero as the value for $LO_{PHA}$. $LO_{PHA}$ is the true LO phase error, which does not vary with frequency.

In the equations above, PHA(f) signifies phase mismatch, which is the deviation from the expected difference between the phase of Q and I observed at frequency f. For a positive tone, the phase of Q is expected to lag the phase of I by 90 degrees, while for a negative tone the phase of Q is expected to lead the phase of I by 90 degrees.

Also in the equations above, MAG(f) signifies magnitude mismatch, represented as the ration of the magnitude of Q to the magnitude of I.

FIG. 2 is a block diagram of a QEC 170 according to one or more examples of the present specification. It should be appreciated that many different architectures of QEC 170, and the embodiment shown herein is disclosed by way of non-limiting example only. In this example, QEC 170 comprises five primary subassemblies: An RF tone generator 220, a QE observer 230, a QE analyzer 240, a QEC controller 250, and an error compensator 280.

In an example, tone generator 220 produces an RF calibration signal that is summed to Rx just before mixer 130. The orthogonality of the resultant signals on I and Q may then be monitored to determine QEs. By using corresponding positive/negative frequency pairs, PD error 110 and LO error 112 may be isolated from BB error 114. Test tones at multiple frequencies are applied to construct a complete profile of IQ mismatch over frequency, and also to provide sufficient independent equations to allow all unknowns to be identified. Analyzing the channel response to a single corresponding frequency pair f identifies LO error if there is no pre-demodulation error and no interference. However, additional pairs are necessary to witness the presence of pre-demodulation error over frequency, or the effect of interference over frequency so these may be countered. If LO error and pre-demodulation error are sufficiently identified, single-sided test tones (just positive or negative) may be used to construct the remaining BB mismatch profile.

In an example, error observer 230 comprises hardware to transform the IQ signal into the frequency domain. Hardware then performs algorithm-specific accumulations and correlations necessary to obtain observations, which may be used to create a profile of phase and gain differences between I and Q over frequency.

In an example, QE analyzer 240 processes observations acquired by the QE Observer subunit to determine correction coefficients to be used by the QE Corrector subunit. Analysis is performed by software executed within an embedded and shared processor, such as an ARM M3. As used throughout this specification, a processor includes any combination of hardware, software, or firmware providing programmable logic, including by way of non-limiting example a microprocessor, digital signal processor, field-programmable gate array, programmable logic array, application-specific integrated circuit, or virtual machine processor. A processor may operate in conjunction with a memory, which includes any suitable volatile or non-volatile memory technology, including DDR RAM, SRAM, DRAM, flash, ROM, optical media, virtual memory regions, magnetic or tape memory, or any other suitable technology.

Analysis is generally not time critical; hardware within error observer 230 executes all necessary real-time observations and computations. For tone-based calibration (TCAL), analysis begins with algebraically combining observations to cancel unwanted error contribution terms. Extreme outliers may be eliminated to purge any contaminated tone observations. Low-pass filtering, both across frequency and observation history (time), may also be performed to improve observation quality. This may be followed by linear, quadratic, or higher order interpolation or curve fitting to estimate gain and phase correction required in subbands lacking tone observation. Subband observations may be missing, for example, either because they were discarded as outliers, or because no tone was applied in that subband during calibration. A final inverse fast Fourier transform (IFFT) may be performed to create time domain correction coefficients. For statistics-based calibration, analysis involves identifying a least mean squares (LMS) fit polynomial that best matches positive/negative frequency observations, and then employing an IFFT to create time-domain correction coefficients.

In an example error compensator 280, QE is corrected by first equalizing Q channel response to I using a real QFIR 260 on Q then subtracting a scalar amount of I from Q in summing block 214 and finally completing equalization of Q to I using a complex compensating finite impulse response filter (CFIR) 270 on Q. The number of taps required may be determined by conservatively identifying the granularity of frequency domain adjustments required to adequately track the IQ mismatch transfer function of QR 100. In addition to forcing Q response to match I, error compensator 280 may add a group delay to I to compensate for the delay added to Q during correction. Delay elements 210 and 212 may be used to provide precise timing for this group delay.

QEC controller 250 may include user-accessible registers, which may be written and read to initiate, configure, and monitor calibration. This subunit also has rudimentary calibration sequencing control over all other subassemblies of QEC 170. In an example, QEC controller 250 may include a separate processor, or may share a processor with QE analyzer 240.

In an example, hardware evaluation of QE is based on DFT, or FFT analysis of test tones. Test tones may therefore be placed at or very near the centers of subbands they examine. Non-centered test tones may result in spectral leakage across multiple FFT subbands. This leakage can increase tone observation noise, especially when the tone is at a frequency near LO, or near the Nyquist frequency. Near LO or Nyquist, leakage from frequency x to −x is greatest due to the circular nature of Fourier analysis. Similarly, leakage possible is at a minimum when x is near one half Nyquist. Leakage from x to −x is most troublesome since this will alias to the very subband being evaluated. Non-centered tones can also interfere with QE identification since dissimilar discontinuities will be witnessed on I and Q channels after DFT, or FFT, windowing. Due to the 90 degree phase difference between I and Q substantially different discontinuities are created, which produce substantially different spectral artifacts. These artifacts may be unrelated to the original signal, and have no particular quadrature relationship.

Regarding the consequences of channel contamination, if undesired (non-tone) channel content is uncorrelated with itself and the test tone over time, it may be reduced along a 3 dB trend for each doubling of the number of observations averaged in the frequency domain. This is due to the difference between tone and noise auto-correlation. Perfect tones constructively interfere when periods are summed gaining 6 dB per doubling of the number of periods summed, whereas uncorrelated signal less-constructively interfere and gains only 3 dB per doubling of samples summed, at least as a trend.

As an alternative to averaging in the frequency domain, SNR may also be improved though averaging multiple (FFT-sized) segments of data in the time domain. That is, data at each offset within a segment may be averaged with data located at the same offset in all other segments to be combined. The result may then be moved to the frequency domain using a single FFT transformation, saving the considerable computations associated with many individual FFTs. If the frequency of the tone is accurate, and channel noise is completely uncorrelated with the test tone, each doubling of the number of segments summed before FFT analysis increases SNR along a 3 dB trend. This comes from tone magnitude improvising by 6 dB per doubling of segments summed, but noise magnitude improving along only a 3 dB trend per doubling. The net improvement in SNR is 3 dB per doubling of the number of segments summed. Presence of tone frequency error detracts from this SNR improvement since the signal phase captured by sequential segment drifts at a rate proportional to frequency error. This degrades correlation between segments. Therefore, although summing segments in the time domain is computationally more efficient, the bulk of required SNR improvement may need to be achieved in the frequency domain to improve the level of immunity to tone frequency error.

SNR also improves with increased FFT or discrete Fourier transform (DFT) analysis size. Specifically SNR, in dB, improves proportional to $10 \log_{10} n_{points}$, where $n_{points}$ is the number of points used in the analysis.

Thermal noise at the antenna sets minimum lower bound on the theoretical level of channel noise. In one example, a design goal for QR 100 is not to degrade this by more than 2 dB (2 dB noise factor). Starting with −174 dBm/Hz room temperature thermal noise, and assuming a gain from LNA input to mixer input of 12 dB, the noise level at mixer 130 input is −174+2+12=−160 dBm/Hz, or −173 dBVrms/Hz assuming 50 ohm loading. If 200 MHz of baseband bandwidth is captured using a 48 point FFT, total noise per subband is $$-173 + 10\log_{10}\frac{200}{48} = -106 \text{ dBVrms.}$$

Since the maximum signal level at mixer input is −17 dBVrms, the greatest tone to noise ratio possible is −17−(−106)=89 dB when a full scale tone is applied. With certain design tradeoffs made in an example embodiment, within QR 100 a full-scale tone is possible only for a transmit loopback path. For Rx channel 104, the tone is limited to −20 dB full scale, reducing tone to noise ratio to 69 dB. However, tone to noise ratio for the receive path may be overwhelmingly dominated by poor antenna isolation, rather than thermal noise. If disabling the LNA and opening a T/R switch were to achieved 50 dB antenna isolation, tone to noise (tone to antenna interference) would be −20−(−50)=30 dB when a full-scale signal is received by antenna 108 within an FFT-sized subband.

After generating appropriate error models according to the TCAL method disclosed herein, QEC 170 may generate correction coefficients for correcting received RF signals. Correction coefficient may use the lumped error models. In an example, correction coefficient may be performed in error compensator 280 of FIG. 2.

The mathematical basis for coefficient generation follows.
The mathematical basis for error observation is given below:

Given:
RF is demodulated to I by mixing with $\cos(2\pi t F_{LO})$, AND
RF is demodulated to Q by mixing with $\cos(2\pi t F_{LO}+\pi/2+E_{LO})=-\sin(2\pi t F_{LO}+E_{LO})$
Where:
$F_{LO}$=LO frequency
$E_{LO}$=LO phase error (total phase of LO for Q is $\pi/2+E_{LO}$)
t=time
Then if an RF tone of frequency $T_{RF}$ is applied to the input of the mixer, the result after low pass filtering will be:
$I=\frac{1}{2}\sin(2\pi t \times (T_{RF}-F_{LO}))$
$Q=\frac{1}{2}\sin(2\pi t \times (T_{RF}-F_{LO})-\pi/2-E_{LO})$
Substituting $T_{BB}=abs(T_{RF}-F_{LO})$,
Then for positive frequencies $(T_{RF}>F_{LO})$
$I=\frac{1}{2}\sin(2\pi t \times T_{BB})$
$Q=\frac{1}{2}\sin(2\pi t \times T_{BB}-\pi/2-E_{LO})$
While for negative frequencies $(T_{RF}<F_{LO})$
$I=\frac{1}{2}\sin(-2\pi t T_{BB})=\frac{1}{2}\sin(2\pi t T_{BB}+\pi)$
$Q=\frac{1}{2}\sin(-2\pi t T_{BB}-\pi/2-E_{LO})=\frac{1}{2}\sin(2\pi t T_{BB}+\pi+\pi/2+E_{LO})=\frac{1}{2}\sin(2\pi t T_{BB}+3\pi/2+E_{LO})$
If I is multiplied by Q*, the result will have:
A magnitude equal to $mag\{I\}\times mag\{Q\}$, AND
A phase equal to $pha\{I\}-pha\{Q\}$ (since the complex conjugate of Q was used)
If we divide this product by $mag^2\{Q[f]\}$, the result will have exactly the magnitude required for the baseband magnitude correction, which is $mag\{I\}/mag\{Q\}$
Note that immediately after the mixer and before baseband error has occurred:
For positive frequencies: $pha\{I\times Q^*\}=pha\{I\}-pha\{Q\}=(\theta)-(-\pi/2-E_{LO})=\pi/2+E_{LO}$
For negative frequencies: $pha\{I\times Q^*\}=pha\{I\}-pha\{Q\}=(\pi)-(3\pi/2+E_{LO})=-\pi/2-E_{LO}$
Any baseband phase error affects positive and negative frequencies in the Q channel equally. So the phase of the correlation becomes:
For positive frequencies: $pha\{I\times Q^*\}=pha\{I\}-pha\{Q\}=\pi/2+E_{LO}-E_{BB}$
For negative frequencies: $pha\{I\times Q^*\}=pha\{I\}-pha\{Q\}=-\pi/2-E_{LO}-E_{BB}$
If instead of using $I\times Q^*$, we use $I^*\times Q$ for negative frequencies only:
For negative frequencies: $pha\{I^*\times Q\}=pha\{Q\}-pha\{I\}=(3\pi/2+E_{LO}+E_{BB})-\pi=\pi/2+E_{LO}+E_{BB}$
If $\pi/2$ is then subtracted from each of the above:
For positive frequencies: $pha\{I\}-pha\{Q\}-\pi/2=\pi/2+E_{LO}-E_{BB}-\pi/2=E_{LO}-E_{BB}$
For negative frequencies: $pha\{Q\}-pha\{I\}-\pi/2=\pi/2+E_{LO}+E_{BB}-\pi/2=E_{LO}+E_{BB}$
The above terms are useful since:
Adding their phases may be used to isolate $E_{LO}$
Subtracting their phases may be used to isolate $E_{BB}$
Two error separation methods are disclosed herein, referred to for convenience as Method 1 and Method 2. Method 1 requires fewer computations than Method 2 below, but is sensitive to pre-demodulation frequency dependent error. The mathematical basis for Method 1 follows:
Given: $C[f]=M[f]\times e^j(E_{LO}-E_{BB}[f])$ for $f>\theta$, AND $M[f]\times e^j(E_{LO}+E_{BB}[f])$ for $f<\theta$
Where: $C[f]$ is calculated based on $I[f]\times Q^*[f]/mag^2\{Q[f]\}$ for $f>\theta$, OR
$I^*[f]\times Q[f]/mag^2\{Q[f]\}$ for $f<\theta$ as derived above
$E_{LO}$=LO phase error (where total phase of LO for Q=$\pi/2+E_{LO}$)
$E_{BB}[f]$=BB phase error evaluated at frequency f
$M[f]=mag\{C[f]\}=mag\{I[f]\}\times mag\{Q[f]\}/mag^2\{Q[f]\}=mag\{I[f]\}/mag\{Q[f]\}$
Then assuming $M[+f]=M[-f]$ and $E_{BB}[+f]=E_{BB}[-f]$:
$(C[+f]+C[-f])/2=(M[+f]\times e^j(E_{LO}-E_{BB}[+f])+M[-f]\times e^j(E_{LO}+E_{BB}[-f]))/2=(M[f]\times e^j(E_{LO}-E_{BB}[f])+M[f]\times e^j(E_{LO}+E_{BB}[f]))/2=M[f]\times e^j E_{LO}\times(e^j(-E_{BB}[f])+e^j(E_{BB}[f]))/2=M[f]\times e^j E_{LO}\times \cos(E_{BB}[f])$
And,
$(C[+f]+C[-f]^*)/2=(M[+f]\times e^j(E_{LO}-E_{BB}[+f])+M[-f]\times e^{-j}(E_{LO}+E_{BB}[-f]))/2=(M[f]\times e^j(E_{LO}-E_{BB}[f])+M[f]\times e^j(-E_{LO}-E_{BB}[f]))/2=M[f]\times e^{-j}E_{BB}[f]\times(e^j(-E_{LO})+e^j(E_{LO}))/2=M[f]\times e^{-j}E_{BB}[f]\times \cos(E_{LO})$
To identify frequency independent LO phase error, extract phase of: $(C[+f]+C[-f])/2$
Then the LO phase correction to apply is $pha\{(C[+f]+C[-f])/2\}=pha\{M[f]\times e^j E_{LO}\times \cos(E_{BB}[f])\}=E_{LO}$
Although the LO phase error identified by each positive & negative frequency pair should be identical, an average across multiple frequency pairs may be used to assist in the elimination of noise included in the observation.
To identify frequency dependent BB phase error, extract phase of:
$(C[+f]+C[-f]^*)/2$
Then the BB phase correction to apply is $pha\{(C[+f]+C^*[-f])/2\}=pha\{M[f]\times e^{-j}E_{BB}[f]\times \cos(E_{LO})\}=-E_{BB}[f]$
To identify frequency dependent BB magnitude correction required, note that $mag\{(C[+f]+C[-f]^*)\}/2$ provides the basis,
But this will be attenuated if there is LO error since:
$mag\{(C[+f]+C[-f]^*)\}/2=mag\{M[f]\times e^j(-E_{BB}[f])\times \cos(E_{LO})\}=M[f]\times \cos(E_{LO})$
Therefore to correct for this $E_{LO}$ induced magnitude attenuation, $mag\{(C[+f]+C[-f]^*)\}/2 \cos(E_{LO})=M[f]\times \cos(E_{LO})/\cos(E_{LO})=M[f]$ must be used instead.
Method 2 requires more computations than Method 1, but it enables observation of pre-demodulation frequency dependent error. The mathematical basis for Method 1 follows:
Given: $C[f]=M[f]\times e^j(E_{LO}-E_{BB}[f])$ for $f>\theta$, AND $M[f]\times e^j(E_{LO}+E_{BB}[f])$ for $f<\theta$
Where:
$C[f]$ is calculated based on $I[f]\times Q^*[f]/mag^2\{Q[f]\}$ for $f>\theta$, OR
$I^*[f]\times Q[f]/mag^2\{Q[f]\}$ for $f<\theta$ as derived above
$E_{LO}$=LO phase error (where total phase of LO for Q=$\pi/2+E_{LO}$)
$E_{BB}[f]$=BB phase error evaluated at frequency f
$M[f]=mag\{C[f]\}=mag\{I[f]\}\times mag\{Q[f]\}/mag^2\{Q[f]\}=mag\{I[f]\}/mag\{Q[f]\}$ Then: $E_{LO}[f]=\frac{1}{2}(\text{pha}\{C[-f]\}+\text{pha}\{C[+f]\})=\frac{1}{2}(a\ \tan(\text{imag}\{C[-f]\}/\text{real}\{C[-f]\})+a\ \tan(\text{imag}\{C[+f]\}/\text{real}\{C[+f]\}))$ And: $E_{BB}[f]=\frac{1}{2}(\text{pha}\{C[-f]\}-\text{pha}\{C[+f]\})=\frac{1}{2}(a\ \tan(\text{imag}\{C[-f]\}/\text{real}\{C[-f]\})-a\ \tan(\text{imag}\{C[+f]\}/\text{real}\{C[+f]\}))$ The values of $E_{LO}[f]$ should be identical at all frequencies of f unless $E_{LO}[f]$ includes a contribution of pre-demodulation frequency dependent phase error (that is, contrary to name, $E_{LO}[f]$ is not associated with just LO error). As a good approximation, the mean of $E_{LO}[f]$ may be taken as mixer LO error, and the variation of $E_{LO}[f]$ over frequency from this mean may be taken as pre-demodulation frequency dependent phase error.

Similarly, M[+f] should be equal to M[−f] unless M[f] includes a contribution of pre-demodulation frequency dependent magnitude error. As a good approximation, the mean of M[+f] and M[−f] for each frequency f may be taken as the BB magnitude error correction required. Meanwhile, the variation of M[+f] and M[−f] from the mean at each frequency f may be interpreted as the amount of pre-demodulation frequency dependent magnitude error.

Regarding BB error 114 compensation, a FIR may be applied to Q as specified in section in the mathematical derivation of paragraph Error! Reference source not found. Specifically, assuming Error Separation Method 2 is used, this filter must apply magnitude correction:

$M[f]=\frac{1}{2}(\text{mag}\{I[f]\}/\text{mag}\{Q[f]\}+\{I[-f]\}/\text{mag}\{Q[-f]\})$ Phase correction comprises:

$-E_{BB}[f]=-\frac{1}{2}(a\ \tan(\text{imag}\{C[-f]\}/\text{real}\{C[-f]\})-a\ \tan(\text{imag}\{C[+f]\}/\text{real}\{C[+f]\}))$ Note that $E_{BB}$ is sign inverted to change from an error term to a correction term.

Also note that only the mean magnitude correction identified for a particular corresponding positive/negative pair is serviced by QFIR 260. The mean is expected to be the dominant magnitude correction required, and may be associated with baseband IQ channel mismatch. The lesser remaining magnitude correction still required, mapped as asymmetrical positive/negative frequency mismatch from this mean, is relegated to CFIR 270. Unlike QFIR 260, CFIR 270 has both I and Q filter taps, and therefore has the capacity to adjust positive and negative frequency response independently. Mapping corresponding positive/negative frequency magnitude mismatch as having asymmetrical (equal but opposite signed) contribution is justified based on simulation of the mixer, and QR 100 silicon evaluation: Non-perfect duty cycle mixer LO has been verified to contribute linear asymmetrical magnitude mismatch over frequency.

Although not associated with BB error 114, it is convenient for the BB correction FIR to include a scalar modifier to compensate for Q channel magnitude loss that is associated with LO error 112. In accordance with the mixer error model, mixer error causes Q channel to be sampled off peak by an amount proportional to $\cos(E_{LO})$, where an amount equal to $-\sin(E_{LO})$ of I included in place of the missing contribution from Q. Adding a gain term of $$\frac{1}{\cos(E_{LO})}$$

to the BB correction FIR may therefore be used to compensate for LO error-induced magnitude loss.

Regarding LO error 112 compensation, in the absence of other pre-demodulation phase error, LO error may be identified using any corresponding frequency pair f. Specifically, the following equation would identity identical LO error regardless of corresponding positive/negative frequency pair evaluated:

$E_{LO}[f]=\frac{1}{2}(a\ \tan(\text{imag}\{C[-f]\}/\text{real}\{C[-f]\})+a\ \tan(\text{imag}\{C[+f]\}/\text{real}\{C[+f]\}))$ If instead this equation calculates different phase for different frequency pairs f, these observations may be used to configure frequency-dependent phase correction. In an example, correction is implemented using CFIR 270. First however, the inherently frequency-independent LO error 112 must be separated from the observations across frequency. This may require a trusted error model to guide error mapping.

Absent a proper error model, the mean inferred LO error 112 across frequency calculated using the equation above could be used to approximate LO. However, phase observed using the lowest frequency pair may provide a better approximation of LO given the inherent reduced influence from frequency-dependent sources. A best approximation however may be determined by calculating a DC intercept. This assumes that that cause of phase observation variation is symmetric about positive/negative separation from DC, and that a low order function can be used to fit theses phase observations.

An inexpensive method for correcting LO error 112 is to add a scalar amount of I to Q. This addition shifts the positive and negative frequencies in the Q channel by equal amounts but in opposite directions. In accordance with the mixer error model, this scalar is equal to $\sin(E_{LO})$. However, since the baseband correction FIR includes a $$\frac{1}{\cos(E_{LO})}$$

scalar that is applied before the addition of I to Q (see FIG. 3), the LO phase correcting scalar must also be gained by this $$\frac{1}{\cos(E_{LO})}$$

factor. This yields a total LO error compensation scalar equal to $$\frac{\sin(E_{LO})}{\cos(E_{LO})},$$

which is the same as $\tan(E_{LO})$.

An alternative approach to the above digital remedy is to directly correct the LO phase within mixer 130. If LO applied to I and Q channels has configurable delay, coarse initial calibration coupled with a final search for the best quantized step may be used to remove LO error at RF. This has the advantage of curing all harmonics present at RF before they alias to baseband, rather curing just the primary image observed at baseband without compensating other harmonics which alias. This is of particular importance if the transmit channel is looped through a calibrated receive channel to facilitate transmit QE calibration. Transmit harmonics may inherently be minimally attenuated in this loopback path.

Regarding PD error 110 correction, residual QE that cannot be countered by the above baseband and LO correction methods are serviced by CFIR 270. Residual magnitude and phase errors are assumed to by asymmetrical about DC for this correction (this is required for phase correction else unknowns cannot be solved given the number of equations available). To reduce implicated filter order, observations may be LMS fit to a low order polynomial, such as a first or second-order polynomial. Fitting to a polynomial reduces observation error "noise," which is apt to be significant given the near-observation-limit correction applied by the CFIR. Data points applied to the LMS fit are created by determining the frequency-specific observation deviation from the values chosen for baseband magnitude and LO phase correction, that is, deviations from the QFIR and LO compensation already chosen.

Figure 3:
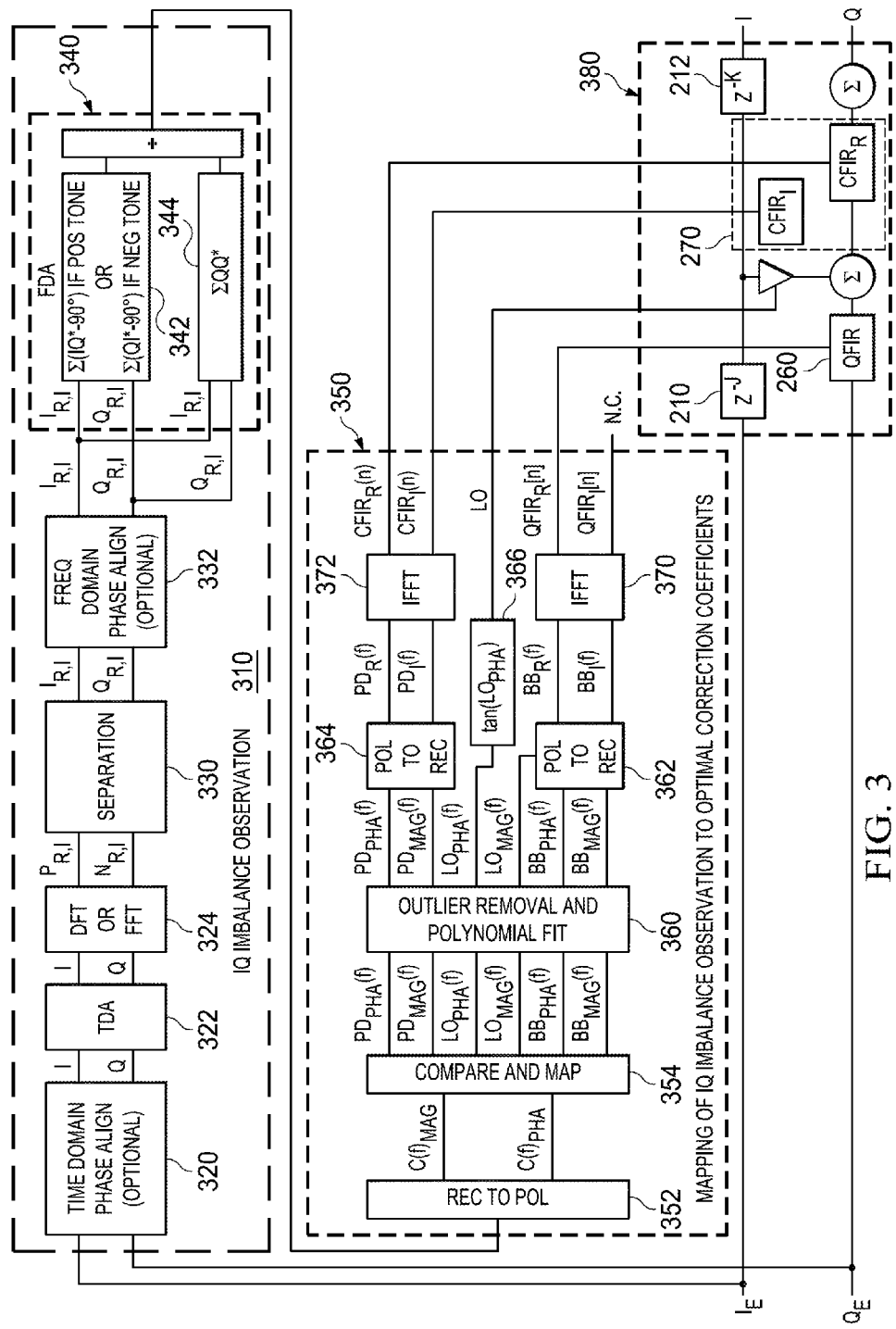
FIG. 3 is a block diagram of a method of detecting quadrature error in polar form according to one or more examples of the present specification.

FIG. 3 is a block diagram of error detection and correction according to one or more examples of the present specification. Implementation is structured to allow hardware to be reused for both tone-based and blind tracking algorithms.

The computations of FIG. 3 may be sequenced through all test tones enabled. In an example, at least a single corresponding frequency pair f is be enabled to calibrate LO error, and at least one tone, either positive or negative, must be applied to each subband needing calibration. The following are performed for enabled tones.

In block 320, I and Q may be phase aligned in the time domain. Note that this step is not necessary in all embodiments.

In block 320, I may be rotated to be within a +/−tolerance of a chosen angle such as zero degrees, and Q may be rotated by precisely the amount that I was rotated. This step improves the immunity of QEC 170 to calibration tone phase noise, though it is not necessary in all embodiments.

In block 322, segments of data are overlap summed like a periodogram to implement time domain averaging (TDA). This begins the process of improving SNR to achieve more accurate measurements. IRR achieved is proportional to the SNR achieved, and SNR may be improved by either time domain averaging or frequency domain averaging measurements as in metablock 340. Frequency domain averaging is superior in some embodiments, as it can reduce consequences associated with calibration tone frequency inaccuracy and phase noise. TDA for this step may comprise the following:

a. For I and Q separately, initialize an n-entry buffer with the first n data samples. In an example, n=48.
   b. Accumulate buffer entries with next n data samples in a round robin fashion.
   c. Repeat step (b) until time domain averaging period expires. Where n=48, results may be samples 1, 49, 97 . . . accumulated, samples 2, 50, 98 accumulated, and so forth. During final averaging, sequentially output n accumulations to initialize the FFT buffer for block 324. Headroom may be provided for the maximum time domain averaging that will be supported. Output may be normalized back to input data width (divided by TDA count). Alternatively, the output could have automatic gain control. This gain control would monitor the largest values accumulated for I and Q, and then shift or gain all accumulated samples of I and Q by an identical amount so that all or most bits of the input data width are occupied with numerically significant bits. That is, the output is gained to a level where at least one accumulated sample of I and Q is very near to saturating the greatest magnitude which may be expressed by the output data width. This technique may be used to reduce the consequence of digital quantization noise since it increases the magnitude of the desired signal. This is of particular importance if the calibration tone is attenuated with respect to a full scale input.

To improve the accuracy of IQ imbalance observations, frequency domain and time domain averaging may be used.

In block 324, a complex DFT or FFT is executed on combined time-domain averaged I and Q data from block 322. The time domain input to the FFT is I+j$_Q$. The output of block 324 is a frequency-domain representation of a tone observation.

In block 330, I and Q are separated from a complex DFT or FFT result. If an FFT is used, only the subband associated with applied tone is examined:

$I_{REAL}[f]=(Y_{REAL}[f]+Y_{REAL}[-f])/2$
$I_{IMAG}[f]=(Y_{IMAG}[f]-Y_{IMAG}[-f])/2$
$Q_{IMAG}[f]=(-Y_{REAL}[f]+Y_{REAL}[-f])/2$
$Q_{REAL}[f]=(Y_{IMAG}[f]+Y_{IMAG}[-f])/2$

In block 332, I may be rotated to be within a +/−tolerance of a chosen angle such as zero degrees, and Q may be rotated by precisely the amount that I was rotated. This step improves the immunity of QEC 170 to calibration tone phase noise, but it is not necessary in all embodiments.

In metablock 340, frequency-domain averaging (FDA) is performed. In block 342, I×Q* is calculated if the tone is positive ($T_{RF}>F_{LO}$, where $T_{RF}$ is the frequency of the tone, and $F_{LO}$ is the LO frequency) or I*×Q is calculated if the tone is negative ($T_{RF}<F_{LO}$), where $T_{RF}$ is the RF tone, and $F_{LO}$ is the LO frequency, and wherein a tone is positive if it is greater than $F_{LO}$ and negative if it is less than $F_{LO}$. Whether positive or negative, 90° is subtracted from the result. Due to Q lagging I by 90 degrees for positive frequencies, and Q leading I by 90 degrees for negative frequencies for a perfect IQ receiver, these calculations produce a complex number having a magnitude equal to the magnitude of I times Q, and a phase equal to the phase adjustment required by Q.

If positive tone:
$IQ_{IMAG}[f]=-I_{REAL}[f]\times Q_{REAL}[f]-I_{IMAG}[f]\times Q_{IMAG}[f]$
$IQ_{REAL}[f]=I_{IMAG}[f]\times Q_{REAL}[f]-I_{REAL}[f]\times Q_{IMAG}[f]$ If negative tone:
$IQ_{IMAG}[f]=I_{REAL}[f]\times Q_{REAL}[f]+I_{IMAG}[f]\times Q_{IMAG}[f]$
$IQ_{REAL}[f]=-I_{IMAG}[f]\times Q_{REAL}[f]+I_{REAL}[f]\times Q_{IMAG}[f]$ In block 344, a magnitude of Q² is calculated.
$Q^2_{MAG}[f]=Q^2_{REAL}[f]+Q^2_{IMAG}[f]$ $IQ_{IMAG}[f]$, $IQ_{REAL}[f]$, and $Q^2_{MAG}[f]$ are accumulated in three separate buffers until frequency-domain averaging (FDA) is complete.

As a final step executed after accumulation is complete, further in block 340, block 342 is divided by block 344. Thus:

$C[f]=FDA\{IQ[f]\}/FDA\{Q^2_{MAG}[f]\}$

In this example, C[f] is magnitude compensated IQ correlation. The result, C[f], will have, for positive frequencies a magnitude of $$\frac{I_{MAG}}{Q_{MAG}}$$

and a phase of $E_{LO}-E_{BB}[f]$.

For negative frequencies, it will be magnitude $$\frac{I_{MAG}}{Q_{MAG}}$$

and phase or $E_{LO}+E_{BB}[f]$.

In an example, the duration of FDA of block 340 is such that, between it and the TDA of block 322, SNR is improved sufficiently to support a target IRR. Both TDA and FDA may be programmable for flexibility. Data path headroom may be provided for a maximum FDA supported. Output may be normalized back to input data width (divided by FDA count).

In an example, metablock 310, comprising IQ imbalance observation, is used repeatedly for each test tone. Once block 310 has processed each test tone, mapping of IQ imbalance to optimal correction coefficients proceeds in metablock 350. In another embodiment, metablock 310 could be duplicated in part or in full to support the processing of multiple tones simultaneously.

In block 350, Q and I are converted from rectangular form to polar form.

Block 354 receives a C[f] phase and magnitude and compares observations at +f and −f to map errors to a lumped error model appropriate to the error source. This mapping is performed over the full frequency range to produce an array of phase and magnitude error values for each of PD error 110, LO error 112, and BB error 114. Conversion from error terms to correction terms is also serviced in block 350. This comprises inverting the sign of phases, and inverting the value of magnitude errors.

In block 360, outliers may be discarded as representing, for example, disturbed measurements. Once outliers are discarded, the remaining values may be fit to an appropriate nth-order polynomial. These steps are described in additional detail below.

In block 364, PD correction coefficients for error 110 is converted from polar notation to rectangular notation.

In block 362, BB correction coefficients for error 114 is converted from polar notation to rectangular notation. Block 362 also receives $LO_{MAG}$, which is used in scaling BB correction coefficients for error 114 to compensate for magnitude list when LO error 112 is removed by summer 214.

In block 366, LO error is converted to a scalar correction coefficient by $LFIR=\tan(LO_{PHA})$. The LO scalar may be provided to an LFIR. LO phase error may be corrected, for example, using a single tap add of I to Q in the digital domain as shown, or by adjusting the delay of LO provided to either the I or Q path within the analog mixer (requires an adjustment feedback loop assuming uncalibrated analog adjustment steps), or using a combination of both these digital and analog methods. Correcting in the analog domain may provide additional benefits, such as reducing pre-demodulation errors. Correcting in the digital domain afterwards is, however, still useful since correction of residual error may be done with both greater precision and ease in the digital domain.

Block 370 performs an IFFT on the rectangular BB correction coefficients for error 114. The output of block 370 is a time-domain representation of FIR correction filter coefficients for BB error 114. Only real time domain coefficients are produced due to the symmetric treatment of positive and negative frequencies within the frequency domain coefficients applied to the input of the IFFT.

Block 372 performs an IFFT on the rectangular PD correction coefficients for error 110. Both real and imaginary time domain coefficients are produced due to the independent treatment of positive and negative frequencies within the frequency domain coefficients applied to the input of the IFFT.

Metablock 380 is a correction block corresponding to error compensator 280 of FIG. 2, where correction coefficients computed in metablock 350 are applied to alter the response of Q. Metablock 380 receives real correction coefficients for error 114, and receives the scalar correction coefficient for LO error 112. Metablock 380 receives both the real and imaginary correction coefficients for PD error 110.

In metablock 380, QFIR 260 compensates for BB error 114 by adjusting only Q. CFIR 270 compensates PD error 110. The scalar LO error 112 is compensated for by summing a portion of I at node 386 with the output of QFIR 260.

Regarding metablock 310, confidence that a single averaged IQ observation is within a certain precision of the true IQ imbalance improves as the number of observations averaged is increased.

Regarding block 360, if multiple subband magnitude observations are obtained before the application of a test tone, and these observations have different levels of time and/or frequency domain averaging, then these observations may be used to estimate the SNR (tone to noise) associated with these levels of averaging, and all levels of averaging in between. Calculation of SNR also requires the knowledge of tone magnitude. A single measurement of tone magnitude would inherently include noise contribution sufficient to degrade SNR determination. This noise may, however, be attenuated sufficiently to be non-dominant if the tone and noise magnitudes used in an SNR calculation are each determined by an averaging of the same number of observation $$\left(\frac{s+n}{n}\right.$$

approximates $$\frac{s}{n}$$

it n is small with respect to s).

Presence of a continuous wave among an uncorrelated signal may interfere with the 3 dB SNR improvement trend expected with each doubling of the number of observation averaged. Specifically, once the magnitude of the uncorrelated signal contribution is attenuated by averaging to the magnitude of a continuous wave, no further SNR improvement occurs. Therefore, based on the lack of 3 dB SNR improvement witnessed per doubling of the number observations averaged, the magnitude of a dominant continuous wave can be approximated. This also identifies the beneficial limit to observation averaging for a particular subband, and the number of observations worth collecting. A rigorous statistical understanding requires numerous observations at a particular level of applied averaging to be gathered, but before a sufficient dataset is gathered to support a given level of confidence, receive signal conditions would likely change making this estimate less relevant. Using just a single estimate to coarsely approximate SNR may therefore be an adequate compromise, particularly if a guard band is applied to lessen the consequence of inaccuracy.

The possible presence of continuous waves makes estimating SNR at greater levels of averaging than observed optimistic, and estimating SNR at lesser levels of averaging than observed potentially pessimistic. Estimates are therefore most accurate when straddled by observations, and not extended outside observations.

Observations having different levels of averaging are efficiently acquired by obtaining a sequence of 2u intermediate observations, each representing the averaging of 2v observations, where u and v are positive integers, and u is greater than v. These 2u×2v total observations may then be merged, by averaging doubled portions of these intermediate observations always starting with the first, to provide information associated with u levels of doublings.

To best support prediction accuracy, noise observations may be made immediately before the application of test tones. This improves the likelihood that signal conditions remain similar, and prediction remains relevant.

One useful application of a coarse estimate of SNR (that is, an estimate obtained after a single period of averaging rather than the more rigorous statistical understanding gained from many such observations) is the identification a subband that has strong likelihood of having noise that isn't attenuated by averaging (that is, has the presence of noise which has higher correlation with itself than anticipated).

Subbands observed having poor SNR potential may be bypassed for tone testing, and neighboring subbands with superior SNR may be used in their stead. Shifting of subbands tested leads to inaccuracy only if this results in a region of rapid transfer function transition to becoming underrepresented.

In an example embodiment, to speed calibration while iterating over block 310, only essential tones are applied. Specifically, tones may be spaced with greater frequency separation in regions where rapid change of IQ imbalance is not expected, or where accuracy of IQ imbalance observations is less critical (this information could be provided by user, or estimated by observation).

In some embodiments, tones are necessary only in frequency regions where correction is required by a user. The exception to this is associated with LO error 112 determination. Regardless of actual user correction requirements in the vicinity, LO error 112 is best observed near DC (using at least one pair of corresponding positive/negative tones f). This is because, near DC, the receiver has not had an opportunity to produce significant IQ imbalance which, if estimated incorrectly, could interfere with the accuracy of LO error 112 observation.

In one embodiment, three corresponding tone pair f are acquired near DC to estimate LO error 112. This allows two out of three pairs to be averaged to determine an estimate of LO error 112 in case one pair implicates a significant outlier value. This method may be expanded to use additional tone pairs beyond just three as necessary.

In some cases, application of tones in pairs may be trimmed to single tones once sufficient observations have been acquired to adequately identify both LO error 112, and the transfer functions associated with both odd symmetric magnitude and odd symmetric phase errors of PD error 110.

Regarding blocks 322 and 340, TDA and FDA may be used to improve tone to noise ratio along a 3 dB trend per doubling of observations averaged, or equivalent doubling the number of data samples included in each observation when channel noise is uncorrelated with both itself and the test tone. Here, an observation refers to the examination of a single FFT result. A proportionally lesser trend is achieved when channel noise is not fully uncorrelated with itself and the test tone.

TDA is computationally more efficient than FDA (fewer FFTs required), and so may provide greater savings from a power and cost standpoint.

A technique may be used to improve the effectiveness of TDA when there is consequential calibration tone phase noise. If data segments are blindly overlapped and summed like a periodogram, calibration tone phase noise can accumulate over time and lead to decreased, or even eliminated, benefit of averaging. This is because uncorrelated noise grows in power along a trend of 3 dB per observations doubled, while tone power increases with a dependency on the phase alignment of the tone periods overlapped and summed in time domain averaging. Specifically, if two tone periods are overlapped/summed, tone power will increase by $10 \log_{10}(2+2 \cos A)$ dB, were A is the phase misalignment between the two tone periods. As an example, if tones are captured from two phase alignment groups, with one group being 90 degrees phase shifted from the other, tone to noise power would experience no improvement from observation doubling. Perfect tone alignment results in 3 dB tone to noise improvement with each doubling of observations, but phase noise combined with deep averaging can deteriorate, or even eliminate all benefit, of averaging unless phase noise is countered.

An inexpensive means of controlling tone phase alignment is to include a circuit which requires that a minimum signal slope be detected before a next tone period is captured and overlapped/summed. Assuming the calibration tone is a sine wave, slope is greatest at zero crossings, so a minimum slope detection check may be used to ensure that all tone periods which are overlap/summed are within a selected +/−tolerance of zero degrees phase. Including tone periods with slopes having leading edges that are either sufficiently positive or sufficiently negative is worthwhile since this can decrease the wait for slopes which eventually arrive and are sufficient. However, if both slope polarities are used, the sign of data captured after a negative slope is inverted before being summed. Otherwise, tone cancelation will be achieved rather than tone reinforcement. Monitoring of maximum tone slope or tone power may be used to calibrate slope limits.

FDA provides superior rejection of tone nonidealities (tone phase error cannot accumulate and reduce tone auto-correlation) so it supports deeper averaging than time domain averaging.

Regarding outlier removal and polynomial fit of block 360, After observations associated with a single sweep of selected tones (reduced from full set to speed calibration) have been acquired using a chosen degree of averaging (to reduce the standard deviation of error to an acceptable level), the accuracy of IQ imbalance identified may still be further improved. Based on the expectation that the true IQ imbalance transfer function is relaxed, sharp discontinuities should be eliminated.

Significant outliers (those outside expected IQ imbalance extremes for QR 100) can be attributed to strong observation interference, and therefore may be discarded. For example, tone observation may have been contaminated with correlated noise.

Moderate outliers (those that fail to reach the threshold of significant outliers) may be due to lesser degrees of observation interference, but they may also be associated with device drift or observation variation that is within statistical norms. Lacking further insight to their source, moderate outliers may be countered by merger with previous historical values per subband using a low-pass filter. This limits immediate reaction without eliminating the ability to track device drift altogether.

Options for low pass filtering include, by way of non-limiting example:
   a. A first order moving average (N−1 previous values are summed with current, and then sum is divided by N)
   b. A lossy integrator (output equals a times new observation, plus 1−α times previous output).

N or α may be selected to balance device drift tracking responsiveness with moderate outlier attenuation desired.

Once significant outliers are eliminated, and moderate outliers have been countered, missing subband observations (either due to outlier removal or lack of applied test tone) may be approximated to complete an estimate of the full IQ imbalance transfer function. Values appropriate to fill these gaps may be determined either before or after error sources are separated into lumped contributors. A variety of curve fitting methods may be used to determine these values, including, by way of non-limiting example:

a. Fit observations to a polynomial minimizing Least-Mean-Squared (LMS) error. Polynomial order should be constrained to limit transfer function complexity b. Estimate non-observed subband values based on linear interpolation between pairs of subbands which were observed, and apply special extensions towards Nyquist and DC extremes. Specifically:
   i. Extend highest frequency observed phase & magnitude to Nyquist. In some cases, this somewhat limits unnecessary complexity of estimated transfer function.
   ii. Repeat lowest frequency observed magnitude to DC. This is based on an assumed fixed I/Q gain error at lowest frequencies.
   iii. Linearly interpolate lowest frequency observed phase down to zero at DC. This is based on an assumed linear phase response of the receiver, at least at low frequency.
   iv. Linearly interpolate phase and gain between pairs of subbands which were observed.

Figure 4:
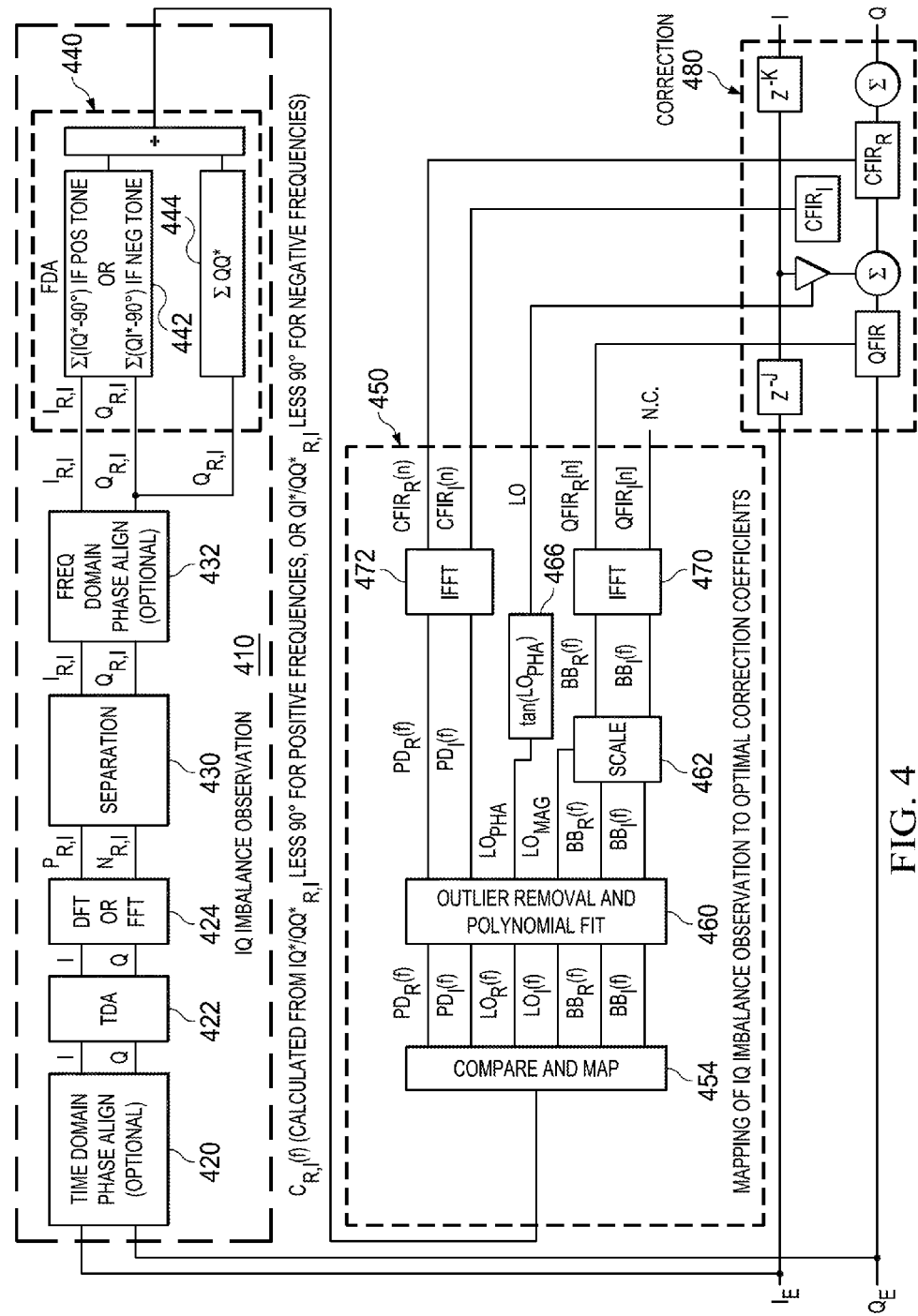
FIG. 4 is a block diagram of a method of detecting quadrature error in rectangular form according to one or more examples of the present specification.

FIG. 4 is a block diagram of error detection and correction according to one or more examples of the present specification. While the embodiment of FIG. 3 maps correction coefficients in polar notation in metablock 350, the embodiment of FIG. 4 maps correction coefficients in rectangular notation in metablock 450.

In an embodiment, block 410 comprises IQ imbalance observation and is substantially identical to block 310 of FIG. 3, and reference is made thereto for additional details concerning block 410. Similarly, blocks 420, 422, 424, 430, 432, 440, 442, and 444 correspond respectively to blocks 320, 322, 324, 330, 340, 342, and 344 of FIG. 3. Like block 310, block 410 may be performed for each test tone.

Block 454 comprises comparing and mapping, and in an embodiment is substantially identical to block 354 of FIG. 3, except that block 454 performs comparison and mapping on rectangular coordinates. Reference is made to block 354 of FIG. 3 for additional details concerning block 454.

Block 460 comprises outlier removal and polynomial fit, and in an embodiment is substantially identical to block 360 of FIG. 3, except that block 460 performs outlier removal and polynomial fit on rectangular coordinates. Reference is made to block 360 of FIG. 3 for additional details concerning block 460.

Block 462 scales correction coefficients for BB error 114 by $LO_{MAG}$.

Block 470 comprises an IFFT, and in an embodiment is substantially identical to block 370 of FIG. 3, except that block 470 performs comparison and mapping on rectangular coordinates. Reference is made to block 370 of FIG. 3 for additional details concerning block 470.

Block 472 comprises an IFFT, and in an embodiment is substantially identical to block 372 of FIG. 3, except that block 472 performs comparison and mapping on rectangular coordinates. Reference is made to block 372 of FIG. 3 for additional details concerning block 472.

Block 466 comprises $\tan(LO_{PHA})$, and in an embodiment is substantially identical to block 366 of FIG. 3, except that block 466 performs comparison and mapping on rectangular coordinates. Reference is made to block 366 of FIG. 3 for additional details concerning block 466.

Block 480 comprises QE correction, and in an embodiment is substantially identical to block 380 of FIG. 3, and reference is made thereto for additional details concerning block 410.

Figure 5:
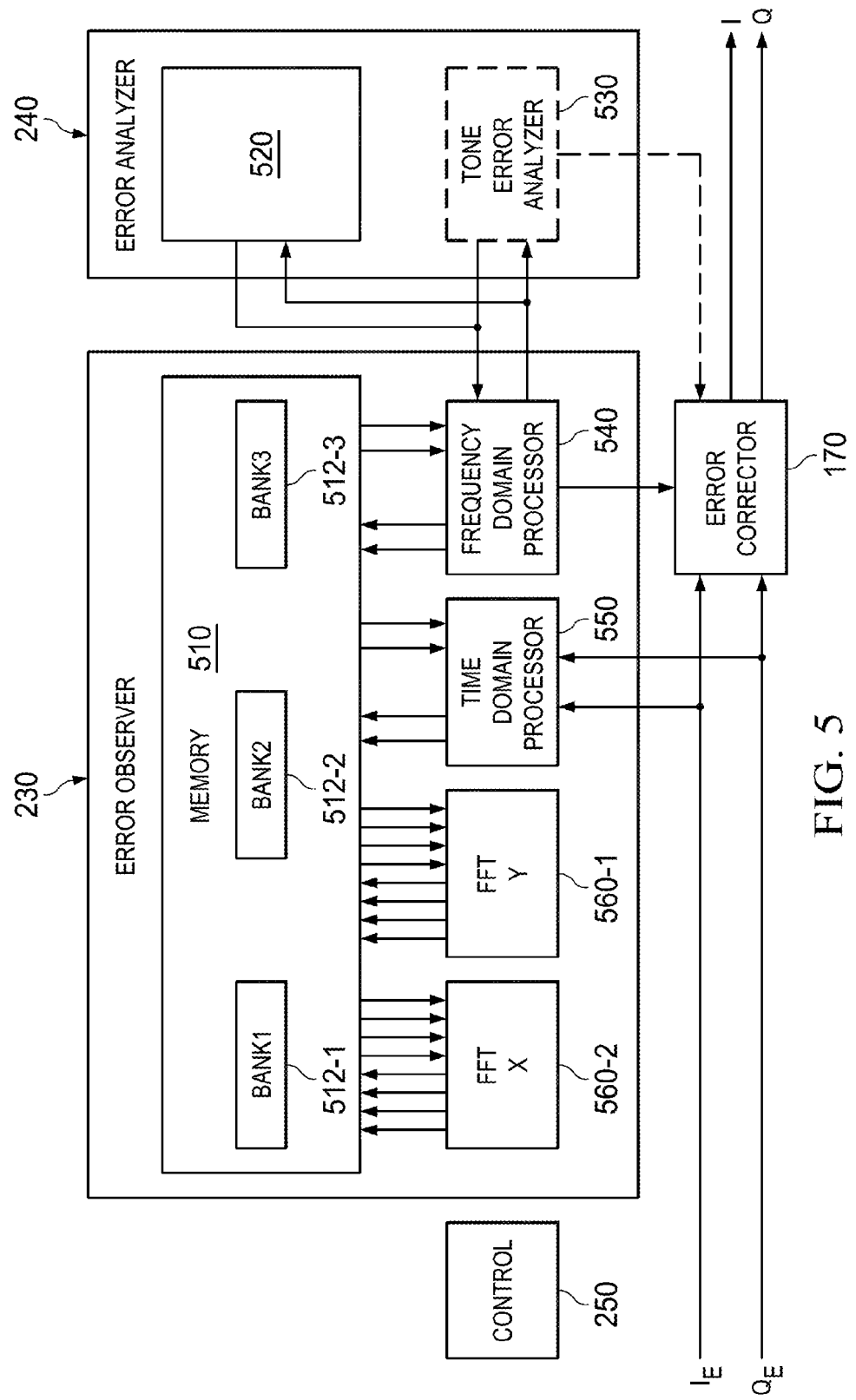
FIG. 5 is a block diagram of an error observer and error analyzer according to one or more examples of the present specification.

FIG. 5 is a block diagram of error observer 230 and error analyzer 240 according to one or more examples of the present specification. It should be noted that FIG. 5 is only a single example implementation that is substantially similar to an ADI® part number AD9368 quadrature error corrector microarchitecture. This example is intended to be non-limiting.

Error observer 230 includes memory 510, two FFT blocks 560, a time domain processor 550, and a frequency domain processor 540.

In an example, time domain processor 550 buffers and assembles segments of Rx I and Q data, which are then processed by a pair of FFT modules FFT X 560-2 and FFT Y 560-1. FFT modules may run staggered and receive alternating assembled segments. This may be necessary when, for example, each FFT module 560 is capable of processing segments at only half the rate that they can be created. In an example, as segments are assembled, a user-specified window is applied if signal *I is asserted. Alternatively, segments may be time domain averaged before being output as specified by I.

In an example, regardless of source of IQ samples, processing of samples by time domain processor 550 is slaved to the rate that samples are received. All processing subsequent to the time domain for QE analysis is in turn slaved to time domain processor 550 output rate. This permits IQ samples to be delivered to QEC 170 at an arbitrary rate and interval up to the QEC 170 clock rate itself.

Segments may be stored in a virtually-addressed memory 510 that is common amongst multiple modules. The use of a virtually-addressed memory 510 allows immediate transfer of results from one module to another. Individual modules require no awareness of the address translation required.

Error analyzer 240 may optionally include a processor 520, which may be any species of processor as described herein. Error analyzer 240 may also include a tone error analyzer 530, which is disclosed as being indirectly connected to error corrector 170. In an example, tone error analyzer 530 may connect to error corrector 170 through frequency domain processor 540.

Memory 510 may include a group of k blocks grouped into j banks 512. It should be recognized that this configuration, and the entire configuration of FIG. 5, is disclosed by way of non-limiting example only, and that many other hardware configurations are possible.

Figure 6:
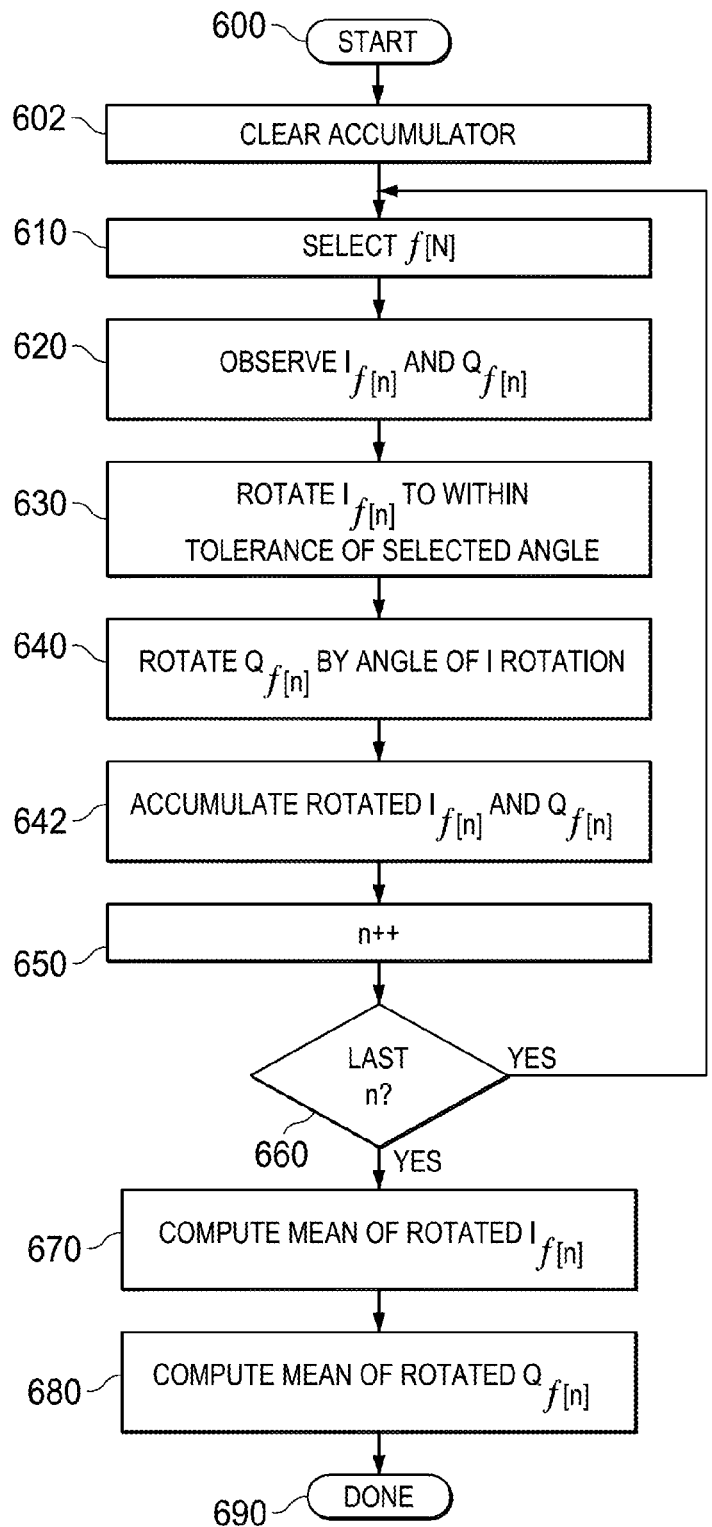
FIG. 6 is a flow chart of a method of performing frequency domain averaging (FDA) according to one or more examples of the present specification.

FIG. 6 is a flow diagram of a method 600 of performing FDA according to one or more examples of the present specification.

FDA and TDA are shown in blocks 322 and 340 respectively of FIG. 3. A balance between the utilization of time and frequency domain averaging is appropriate to achieve greatest accuracy with greatest efficiency. The appropriate ratio depends on the purity of an RF test tone (that is, its lack of frequency error, and lack of phase noise which can mimic frequency error)

In an example, metablock 340 identifies the IQ correction required, in part, by calculating IQ*/QQ* over frequency. This yields a complex number which has a phase equal to the difference between the phase of I and Q, and a magnitude equal to the magnitude of $$\frac{I}{Q}.$$

From this, phase and magnitude correction over frequency are easily extracted. However, the accuracy of the numerator and denominator of this calculation do not benefit equally from averaging of multiple observations; observation noise is not equally eliminated by averaging. For the numerator, uncorrelated noise in I and Q which has zero mean will still have a zero mean after I is multiplied times Q*. Therefore averaging may be used to decrease the power of this noise. However for the dominator, since Q is multiplied by Q*, noise is inherently correlated during the multiplication, and this will sacrifice the zero mean. Averaging therefore will be of limited benefit to reduce this particular noise source. Method 600 however may be employed to eliminate the noise in Q before the QQ* multiplication.

Continuing with FIG. 6, in an example, in block 602 two compex accumulators is cleared will store accumulations of modified I and Q terms.

In block 610, a frequency f is selected from an n-element array of test frequencies (f[n]).

In block 620, frequency f[n] is observed for the values of $I_{f[n]}$ and $Q_{f[n]}$.

In block 630, $I_{f[n]}$ is rotated to within a tolerance of a selected angle, such as zero degrees. In block 640, $Q_{f[n]}$ is rotated by the exact same amount. In an embodiment, it is more important to rotate I and Q identically than it is to rotate I perfectly to 0 degrees, or some other selected angle. In one example, merely swapping real and imaginary terms and inverting their signs may be used to rotate I to between 0 and 90 degrees (no multiplies required). Comparing the magnitude of the real and imaginary parts of I may be used to determine if I is between 0 and 45, or 45 and 90 degrees. If the imaginary part of I is greater than the real part of I, I is between 45 and 90 degrees, it should be rotated −45 degrees so that it is between 0 and 45 degrees. This may be done imprecisely with a multiplier having only a few bits since slight gain error may be introduced without consequence, providing it is done equally to I and Q Recall that I is compared to Q, so gain error common to both is inconsequential. This technique can be further elaborated to inexpensively rotate I sufficiently close to 0 degrees to achieve most of the benefit that full rotation of I to 0 degrees, or a different selected angle chosen, can provide.

The rotation of this block is used to cancel phase noise. No useful information is lost by this rotation since correction is based on observing the relationship difference between I and Q. Relationship in common provides no useful information (at least to this particular observation). Without the rotation, I and Q would each sum to near zero, assuming phase noise and deep time domain averaging result in an equal distribution of phase of I and Q averaged.

In block 642, the rotated I and Q values are accumulated in the accumulator that was cleared in block 602. This may be a complex accumulator, since I and Q both have complex representation.

In block 650, n is incremented.

Decision block 660 checks whether this is the last n. If it is not, then control passes back to block 610 to evaluate the next test frequency. If the last n has been reached, control passes to block 670.

In block 670, an average such as a mathematical mean may be computed for the accumulated I results. Mathematical mean is disclosed only as one possible example, and many other averaging, accumulating, or aggregating methods may be used.

In block 680, an average such as a mathematical mean may be computed for the accumulated Q results.

In block 690, the method is done.

The accumulated and averaged values of I and Q from method 600 may be used to calculate IQ*/QQ*. This differs from the techniques discussed earlier that accumulate IQ* separate from QQ*, and at the end divides IQ* by QQ*. In method 600, I and Q for each FFT result must be rotated, but multiplication of IQ* and QQ*, as well as the division of IQ*/QQ*, are done just once at the end.

The system and method of the foregoing paragraphs realizes numerous advantages.

Identifying IQ imbalance free of observation error is important not only to permit precise identification of the correction required, but also to enable identification of a simplest implementation for this correction.

If IQ imbalance is accurately isolated into lumped analog sources (see error model), complexity of correction implicated is substantially decreased.

IQ imbalance compensation would be more costly if attempted in a single correction stage since:

A relatively low-order transfer function is sufficient to describe each individual lumped source since each is associated with a finite number of dominant analog error sources. However, once error sources combine, apparent complexity of correction significantly rises due to the fundamentally different influence each lumped error source contributes to IQ imbalance, particularly with respect to positive versus negative frequency influence.

It's possible to achieve highly efficient and highly accurate correction providing lumped error sources are uniquely identified, and compensated in the opposite order created. This allows each lumped error source to receive compensation from a correction structure which is specially optimized to each situation, enhancing both correction accuracy and computational efficiency.

However, if observation error is present (particularly if random), a significantly higher order correction will be implicated; the simpler underlying transfer function of the true IQ imbalance is hidden.

At minimum, observation error which isn't eliminated increases the order and complexity of the IQ imbalance correction implicated, and consequently increases the power and silicon cost associated of its implementation.

If observation noise is too high, a fixed hardware implementation may be insufficient to represent the intended transfer function. If this occurs, the realized correction filter may exhibit significant transfer function ringing between directly specified frequency points. As a consequence, IQ mismatch could be increased rather than decreased by the correction structure.

Note that the activities discussed above with reference to the FIGURES are applicable to any integrated circuits that involve signal processing (for example, gesture signal processing), particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. An integrated circuit for correcting quadrature error in a received signal comprising circuitry and logic operable for:
   receiving a separate error correction coefficient for each of a plurality of sequential error sources, comprising at least a local oscillator (LO) error source and a baseband (BB) error source; and
   applying the error correction coefficients to the received signal in a reverse order of the sequence of the error sources; whereby interaction of unrelated error sources is avoided.

2. The integrated circuit of claim 1, wherein each error source is characterized by a lumped error model.

3. The integrated circuit of claim 1, wherein the plurality of error sources further comprises a pre-demodulation (PD) error.

4. The integrated circuit of claim 3, wherein the sequence of the error sources is PD, LO, BB, and wherein the sequence of applying error correction is BB, LO, PD.

5. The integrated circuit of claim 1, wherein calculating an error correction factor for each stage comprises:
   producing a full set of frequency-domain BB correction coefficients;
   producing an LO correction scalar; and
   producing complex filter coefficients.

6. The integrated circuit of claim 5, wherein the circuitry and logic are further operable for scaling the LO correction scalar by $$\frac{1}{\cos E_{LO}}$$

to compensate for the compensation applied in the baseband correction filter (QFIR) for the LO phase error induced magnitude loss.

7. The integrated circuit of claim 1, wherein the circuitry and logic are further operable for scaling a baseband correction filter gain by $$\frac{1}{\cos E_{LO}}$$

to compensate for an LO phase error induced magnitude loss, wherein $E_{LO}$ represents LO phase error.

8. The integrated circuit of claim 1, wherein LO phase error may be countered using a configurable LO delay in an analog mixer.

9. The integrated circuit of claim 8 further comprising a feedback loop to tune the integrated circuit to compensate for nonlinearities.

10. The integrated circuit of claim 1, further comprising a plurality of coefficient buffers operable to support optimal coefficient update options.

11. The integrated circuit of claim 1, further comprising a baseband processor, and wherein if coefficient updates are not managed by the baseband processor, generation of undesirable artifacts upon coefficient update may be prevented by ramping to new coefficients using a multitude of smaller steps.

12. A quadrature receiver comprising:
a receiver channel operable for receiving a radio frequency (RF) signal; and
a quadrature error corrector operable for:
- receiving a separate error correction coefficient for each of a plurality of sequential error sources, comprising at least a local oscillator (LO) error source and a baseband (BB) error source; and
- applying the error correction coefficients to the RF signal in a reverse order of the sequence of the error sources; whereby interaction of unrelated error sources is avoided.

13. The quadrature receiver of claim 12, wherein each error source is characterized by a lumped error model.

14. The quadrature receiver of claim 12, wherein the plurality of error sources further comprises a pre-demodulation (PD) error.

15. The quadrature receiver of claim 14, wherein the sequence of the error sources is PD, LO, BB, and wherein the sequence of applying error correction is BB, LO, PD.

16. The quadrature receiver of claim 12, wherein calculating an error correction factor for each stage comprises:
producing a full set of frequency-domain BB correction coefficients;
producing an LO correction scalar; and
producing complex filter coefficients.

17. The quadrature receiver of claim 16, further comprising scaling the LO correction scalar by $$\frac{1}{\cos E_{LO}}$$

to compensate for the compensation applied in the baseband correction filter (QFIR) for the LO phase error induced magnitude loss.

18. The quadrature receiver of claim 12, further comprising scaling a baseband correction filter gain by $$\frac{1}{\cos E_{LO}}$$

to compensate for an LO phase error induced magnitude loss, wherein $E_{LO}$ represents LO phase error.

19. The quadrature receiver of claim 12, wherein LO phase error may be countered using a configurable LO delay in an analog mixer.

20. The quadrature receiver of claim 19, further comprising a feedback loop to tune the quadrature error corrector to compensate for nonlinearities.

21. The quadrature receiver of claim 12, further comprising a plurality of coefficient buffers operable to support optimal coefficient update options.

22. The quadrature receiver of claim 12, further comprising a baseband processor, and wherein if coefficient updates are not managed by the baseband processor, generation of undesirable artifacts upon coefficient update may be prevented by ramping to new coefficients using a multitude of smaller steps.

23. A method of detecting quadrature error in a received signal comprising:
- receiving a separate error correction coefficient for each of a plurality of sequential error sources, comprising at least a local oscillator (LO) error source and a baseband (BB) error source; and
- applying the error correction coefficients to the RF signal in a reverse order of the sequence of the error sources; whereby interaction of unrelated error sources is avoided.

24. The method of claim 23, wherein each error source is characterized by a lumped error model.

25. The method of claim 23, wherein the plurality of error sources comprises, in sequence, a pre-demodulation (PD) error, local oscillator (LO) error, and baseband (BB) error, and wherein the sequence of applying error correction is BB, LO, PD.

* * * * *